March 7, 1961  W. B. BANKS  2,973,639
MASS PRESENCE SENSING DEVICE
Filed Aug. 4, 1955
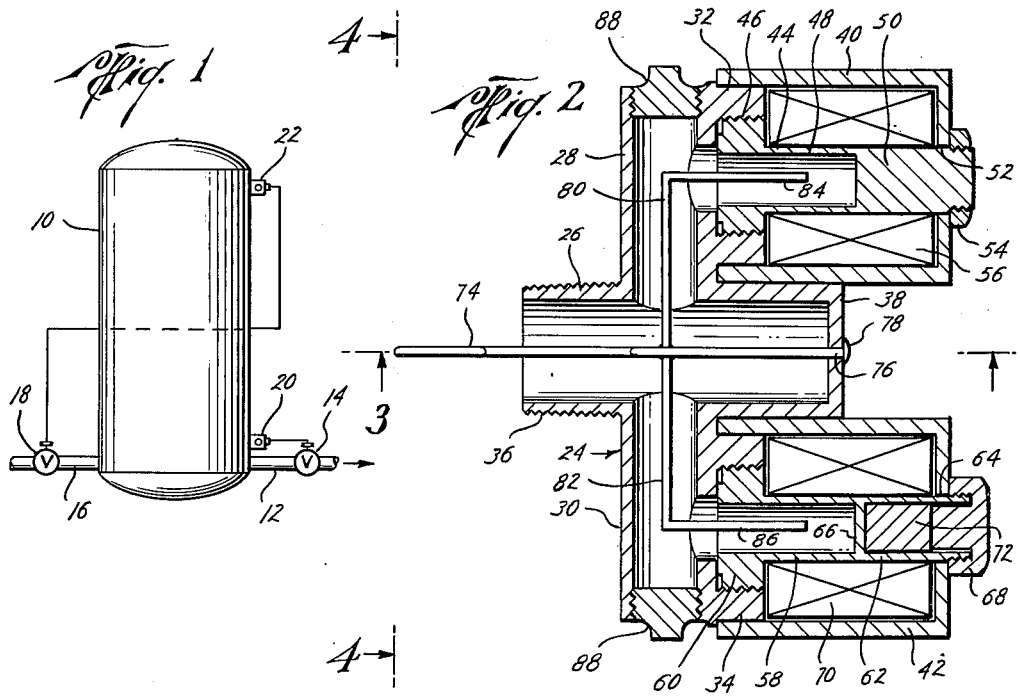
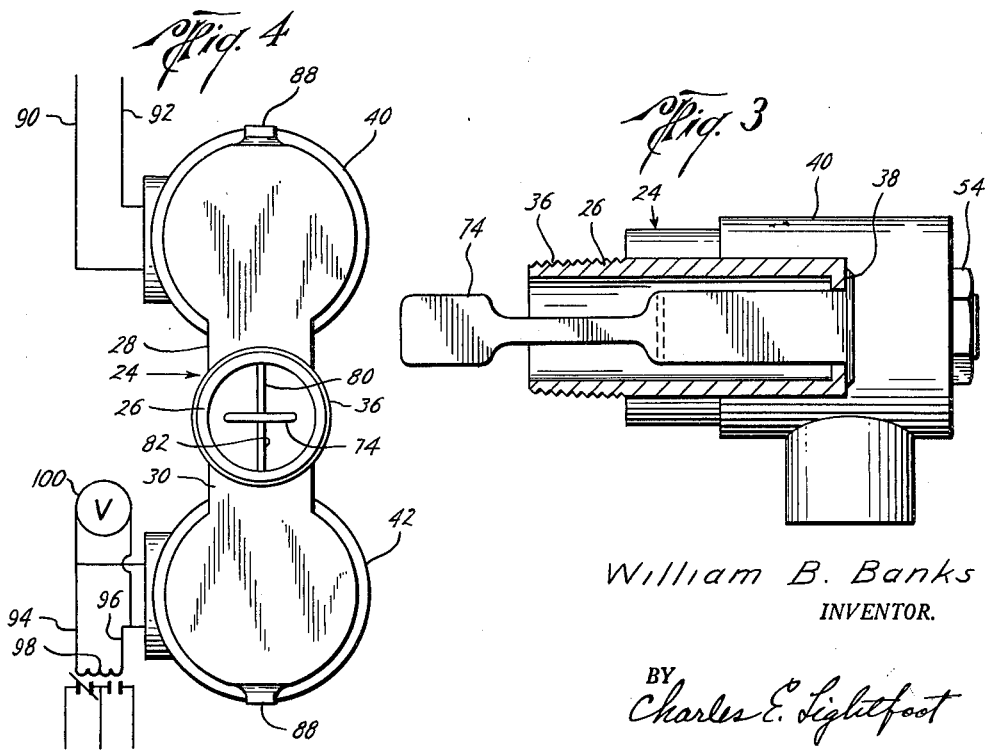
William B. Banks
INVENTOR.
BY Charles E. Lightfoot
ATTORNEY United States Patent Office 2,973,639
Patented Mar. 7, 1961

2,973,639

MASS PRESENCE SENSING DEVICE

William B. Banks, Odessa, Tex., assignor to Automation Products, Inc., Houston, Tex., a corporation of Texas Filed Aug. 4, 1955, Ser. No. 526,424

3 Claims. (Cl. 73—54)

This invention relates to a mass presence sensing device and more particularly to an instrument for use in determining changes in the physical characteristics of materials and especially of fluent materials.

The invention is capable of wide general application in connection with the measurement of various physical properties of fluent materials, such as density, specific gravity or viscosity, and as a device for determining the presence or absence of substances as indicated by a change in such properties. The invention also finds particular utility in connection with apparatus for the indication and control of liquid level in receptacles, such as tanks or the like.

Numerous devices have been proposed heretofore for use in enclosed spaces, such as tanks, pipes, or the like whereby the level of material in such spaces, rate of flow of the same or some physical property of the material, could be determined. As heretofore provided, however, devices of this character possess the disadvantage that they require the extension of some moving part through a wall of the enclosure, necessitating the use of flexible diaphragms, or other structural features likely to be adversely affected by pressure, or whose operation is rendered unreliable thereby.

The present invention has for an important object the provision of a mass presence sensing device having a movable element which is adapted to be positioned within an enclosed space in position to be acted upon by material therein and embodying means for indicating the effect of the material upon the movement of the element.

Another object of the invention is to provide a device of the kind referred to embodying a casing whose interior is exposed to the material in connection with which the determination is to be made and within which all of the moving parts effected by the material are contained.

A further object of the invention is the provision of equipment of the character mentioned which is electrically operated and wherein the moving parts of the instrument are located in and exposed to the pressure of the material being tested.

Another object of the invention is to provide an instrument of the type set forth, which is adapted for attachment to tanks or other vessels or enclosures and embodying a casing whose interior is in communication with the interior of the tank and within which casing the moving parts of the instrument are disposed.

A further object of the invention is the provision of an instrument of the character referred to, such as a liquid level indicator, or the like, embodying a movable element in the form of a vibrator adapted to be located to extend into a container or the like in position to be contacted by the liquid therein when the liquid reaches a predetermined level in the container, and including electromagnetic means for causing the element to vibrate at a constant frequency and means for measuring the magnitude of the vibration of the element.

Another object of the invention is to provide an indicator or measuring instrument of the character set forth, which is easily applied to various types of equipment and which is easily assembled and disassembled, and in which the parts are readily replaceable for purposes of maintenance and repair.

A still further object of the invention is to provide a device of the kind mentioned which is of simple design and rugged construction, which may be economically manufactured, and which is positive and accurate in operation.

The above and other important objects and advantages of the invention will best be understood from the following detailed description, constituting a specification of the same, when considered in conjunction with the annexed drawings, wherein:

Figure 1 is a side elevational view, partly diagrammatic illustrating one exemplification of the invention, and showing the application of the same in liquid level control apparatus;

Figure 2 is a horizontal, central, cross-sectional view on an enlarged scale, of the exemplification of the invention illustrated in Figure 1, showing details of construction of the sensing instrument;

Figure 3 is a cross-sectional view, taken along the line 3—3 of Figure 2, looking in the direction indicated by the arrows; and Figure 4 is an end elevational view looking at the left hand end of the invention as seen in Figure 2, and showing diagrammatically the electrical circuits employed therewith.

For purposes of illustration the invention is shown herein in its application to liquid level control apparatus, it being understood that this is intended by way of example only, and that the invention is capable of many and varied uses, too numerous to mention, such as in connection with the determination of density, specific gravity, rate of flow and other physical properties of materials whether gases, liquids or solids.

Referring now to the drawings in greater detail the invention is shown in Figure 1 applied to a tank 10, of conventional type designed to contain liquid and wherein it may be desirable to control the level of the liquid. The tank is conveniently provided with an outlet connection 12, controlled by a valve 14 and an inlet connection 16 which may be under the control of a valve 18. The valves 14 and 18, in the present illustration, are preferably electrically operated, the valve 14 being operable through the intermediation of the device 20 of the invention which is applied to the lower portion of the tank in communication with the interior thereof and which is operable when the level of the liquid falls below a predetermined lower limit to close the valve 14, and the valve 18 being similarly operable under the control of the device 22 to close the valve 18 when the level of the liquid rises above a predetermined upper limit. Thus, the outflow of liquid from the tank will be shut off before the tank is completely emptied and the inflow of liquid to the tank may take place until the tank is filled to the predetermined upper limit.

It will be appreciated that the above arrangement is one of many different ways in which the level of liquid in a tank or container could be controlled or regulated by the use of the invention and is intended merely for exemplification and not by way of limitation.

As shown in Figures 2 to 4, the indicator or control instrument of the invention includes a hollow casing or housing, generally indicated at 24, having a central tubular portion 26 from which tubular side portions 28 and 30 extend, the side portion 28 having a tubular extension 32, and the side portion 30 having a similar tubular extension 34, which extensions are positioned substantially at right angles to the axes of the side portions.

The central tubular portion 26 is externally threaded at its outer end as indicated at 36, for threadable attachment within an internally threaded opening in the tank 10, or other enclosure to which the instrument is to be attached, and is closed at its inner end as shown at 38.

The body or casing 24 may be formed of metal, and the extensions 32 and 34 are provided with tubular caps 40 and 42, respectively, of magnetic material, secured thereto in any convenient manner, as by welding.

A tubular non-magnetic element 44, having an externally threaded, externally enlarged end portion 46, is threaded into the extension 32, and has an externally reduced end portion 48, extending into the interior of the cap 40, and a magnetic core element 50, in the shape of a screw extends into the cap 40 through an opening 52 in its outer end, this screw being provided with a nut 54 exteriorly of the cap. Within the cap 40 an electromagnetic coil 56 surrounds the reduced portion 48 of the non-magnetic element 44 and the magnetic core 50.

A non-magnetic tubular element 58 having an externally threaded externally enlarged portion 60 is threaded into the extension 34, and has a portion 62 of reduced external diameter, extending into the cap 42, and through an opening 64 in the outer end of the cap, which portion has a partition 66 mediate its ends. At its outer end the element 58 is externally threaded to receive a cap 68 threaded thereon exteriorly of the cap 42.

Within the cap 42 an electromagnetic coil 70 surrounds the portion 62 of the non-magnetic element 58. A permanent magnetic element 72 is disposed within the portion 62 of the non-magnetic element 58, between the partition 66 and the inner end of the cap 68.

A vibratory element 74, which may take the form of a metallic reed, of suitable shape, such as that shown, is attached at its inner end to the closed end 38 of the tubular portion 26, and extends outwardly therefrom through the open outer end of this tubular portion. The vibratory element may be attached to the casing in any suitable manner, as by being extended through an opening 76 in the closed end 38, and welded or otherwise attached to the exterior of the casing, as indicated at 78. Mediate its ends the vibratory element is provided with side arms 80 and 82, respectively, the arm 80 being bent to provide an extension 84, which projects into the tubular non-magnetic element 44, and the arm 82 being likewise bent to form an extension 86 which extends into the tubular element 58. The side arms 80 and 82 are formed of magnetic material. The vibratory element is supported at its inner end, centrally of the tubular portion 26, and supports the side arms 80 and 82 with the extensions 84 and 86 centrally located in the tubular elements 44 and 58, so that the vibratory element is free to vibrate without engaging the interior of the casing.

The outer ends of the side portions 28 and 30 may be internally threaded to receive closure plugs 88.

It will be apparent that the casing structure described above is entirely closed, except for the outer end of the tubular portion 36, which will be in communication with the interior of the tank or enclosure in which the material whose physical properties are to be determined is located.

The electromagnetic coil 56 constitutes the driving means by which the vibratory element is caused to vibrate, and the electromagnetic coil 70 constitutes a pick-up device, by which the amplitude of the vibration of the vibratory element may be determined.

The driving coil 56 may be connected to any suitable source of alternating or pulsating current, through conductors 90 and 92, as indicated in Figure 4 of the drawings, whereby the side arm 80 of the vibratory element will be attracted and repulsed, to cause the vibratory element to vibrate at any desired frequency.

The pick-up coil 70 may be connected in any suitable manner, as by means of the conductors 94 and 96 to any convenient type of electrical circuit, such as the circuit containing the relay coil 98, provided with contacts suitably arranged to open and close control circuits such as those including the valves 14 and 18, whereby the inflow of liquid to the tank 10 and outflow of liquid therefrom may be controlled in response to the amplitude of vibration of the vibratory element. Suitable means, such as a volt meter 100 may be connected into the relay circuit, whereby the change in amplitude of vibration of the vibratory element which takes place when the liquid in the tank makes contact with the element may be indicated.

The vibratory element 74 may be of any desired configuration, such as that shown in the drawings, wherein the outer end portion of the element is of increased width, so that the restraining effect of the liquid in the tank when the vibratory element is in contact with the liquid is increased.

In making use of the invention, constructed as described above, the casing is screwed into an opening in the tank at the desired level, the outer end of the vibratory element being then positioned beyond the open end of the casing within the tank. When the level of the liquid in the tank is below the vibratory element the element will vibrate at a predetermined amplitude, and as soon as the level of the liquid rises to a point at which the vibratory element is in contact with the liquid the vibration of the element will be restrained, so that the amplitude of vibration will be reduced, thus causing a reduction in the voltage produced in the pick-up coil 70, which will be indicated on the volt meter 100 or other indicating device.

It will be apparent that the invention, as thus constructed, is capable of use with a wide variety of different substances, such as powdered materials, gases, liquids, and the like whose density may vary, thus varying the amount of restraint to which the vibration of the vibratory element is subjected, whereby the density, or other physical characteristic of the substance may be indicated. Likewise, the invention may be used in connection with apparatus for indicating the rate of flow of fluent material, by positioning the vibratory element in the path of flow, whereby an increase in the rate of flow of the material will result in an increase in the restraint exerted on the vibratory element to reduce the amplitude of vibration, which may be used to indicate a change in the rate of flow.

It will thus be seen that the invention provides a measuring instrument or indicator of simple design, which may be used in numerous ways in connection with equipment of the character mentioned, and which is accurate and trouble free in operation.

While the invention has been described herein in connection with a certain specific embodiment of the same, it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secure by Letters Patent is:

1. A device for indicating a change in condition of a fluent material comprising a hollow casing having an inner chamber, means for supporting the casing on an enclosure into and out of which a fluent material may flow with said chamber in communication with the interior of the enclosure, an elongated flexible vibratory element mounted in the casing in said chamber extending into the enclosure into the path of flow of said material and having a rigid connection at one end with the casing, an electromagnetic coil in the casing positioned outside of said chamber, an electrical circuit into which said coil is connected to alternately energize and deenergize said coil, a first arm formed of magnetic material on and extending laterally from said element in position to be effected by the magnetic field of said coil to cause the element to vibrate, a second arm formed of magnetic material on said element opposite said first arm and electromagnetic means positioned to be effected by vibratory movement of said second arm to indicate a change in the amplitude of vibration of said element.

2. A a device for indicating a change in condition of a fluent material comprising a hollow casing having an inner chamber, means for supporting the casing on an enclosure into and out of which a fluent material may flow with said chamber in communication with the interior of the enclosure, an elongated, flexible, vibratory element in the casing in said chamber whose inner end is rigidly attached to a wall of the casing and whose outer end extends into the enclosure in position to be contacted by said material, an electro-magnetic driving coil in the casing externally of the chamber means connecting said coil to a source of alternating electrical current, an electromagnetic pick-up coil in said casing externally of the chamber, means electrically connected to said pick-up coil for indicating a change in amplitude of vibration of said element, magnetic means carried by and extending in one direction laterally from said element in position to be actuated by said driving coil to cause said element to vibrate, and magnetic means carried by and extending in the other direction laterally from said element in position for movement therewith relative to said pick-up coil to cause a flow of current in said pick-up coil.

3. A device for indicating a change in condition of a fluent material comprising a hollow casing having an inner chamber, means for supporting the casing on an enclosure into and out of which a fluent material may flow with said chamber in communication with the interior of the enclosure, an elongated flexible vibratory element in the casing in said chamber whose inner end is rigidly connected to a wall of the casing and whose outer end extends into the enclosure in position to be contacted by said material, an electromagnetic driving coil in the casing externally of the chamber, means connecting said coil to a source of alternating electrical current, an electromagnetic pick-up coil in said casing externally of the chamber, means electrically connected to said pick-up coil for indicating a change in amplitude of vibration of said element, oppositely extending arms formed of magnetic material on said element one of which is positioned in the magnetic field of said driving coil to cause the element to vibrate and the other of which extends into the magnetic field of said pick-up coil to cause a flow of current in the pick-up coil upon vibrational movement of said element.

References Cited in the file of this patent

UNITED STATES PATENTS

| | | |
|---|---|---|
| 2,142,854 | La Pierre | Jan. 3, 1939 |
| 2,354,923 | McNamee | Aug. 1, 1944 |
| 2,358,374 | Ashcraft | Sept. 19, 1944 |
| 2,472,249 | De Giers et al. | June 7, 1949 |
| 2,550,052 | Fay | Apr. 24, 1951 |
| 2,633,016 | Millington | Mar. 31, 1953 |
| 2,701,469 | Burns | Feb. 8, 1955 |
| 2,722,614 | Fryklund | Nov. 1, 1955 |
| 2,808,581 | Findlay | Oct. 1, 1957 |

FOREIGN PATENTS

| | | |
|---|---|---|
| 899,057 | France | July 24, 1944 |